(12) United States Patent
Wang et al.

(10) Patent No.: US 11,343,526 B2
(45) Date of Patent: May 24, 2022

(54) METHOD OF VIDEO PROCESSING FOR CALIBRATING MOTION VECTORS

(71) Applicant: Realtek Semiconductor Corp., HsinChu (TW)

(72) Inventors: Yanting Wang, Suzhou (CN); Guangyu San, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/137,280

(22) Filed: Dec. 29, 2020

(65) Prior Publication Data

US 2022/0103852 A1  Mar. 31, 2022

(30) Foreign Application Priority Data

Sep. 25, 2020 (CN) .......................... 202011021710.4

(51) Int. Cl.
*H04N 19/513* (2014.01)
*H04N 19/18* (2014.01)
*H04N 19/176* (2014.01)
*H04N 19/139* (2014.01)

(52) U.S. Cl.
CPC ......... *H04N 19/513* (2014.11); *H04N 19/139* (2014.11); *H04N 19/176* (2014.11); *H04N 19/18* (2014.11)

(58) Field of Classification Search
None
See application file for complete search history.

(56) References Cited

U.S. PATENT DOCUMENTS

| 2012/0250945 | A1* | 10/2012 | Peng | ...................... | G06T 7/223 382/107 |
| 2012/0308144 | A1* | 12/2012 | Tokunaga | .............. | H04N 19/53 382/206 |
| 2013/0230099 | A1* | 9/2013 | DeForest | ............. | H04N 19/543 375/240.08 |

FOREIGN PATENT DOCUMENTS

| TW | 200522708 | | 7/2005 |
| TW | 201101806 | A1 | 1/2011 |

* cited by examiner

*Primary Examiner* — Christopher G Findley
(74) *Attorney, Agent, or Firm* — Winston Hsu

(57) ABSTRACT

A video processing method includes dividing a current frame into a plurality of blocks, generating a motion vector of each block of the plurality of blocks of the current frame according to the each block of the current frame and a corresponding block of a previous frame, generating a global motion vector according to a plurality of motion vectors of the current frame, generating a sum of absolute differences of pixels of each block of the current frame according to the global motion vector, generating a region with a set of blocks of the current frame, matching a distribution of the sum of absolute differences of pixels of the region with a plurality of models, identifying a best matching model, and labeling each block in the region in the current frame with a label of either a foreground block or a background block according to the best matching model.

10 Claims, 6 Drawing Sheets

METHOD OF VIDEO PROCESSING FOR CALIBRATING MOTION VECTORS

BACKGROUND OF THE INVENTION

1. Field of the Invention

The present invention is related to a video processing method, and more particularly to a video processing method capable of calibrating motion vectors.

2. Description of the Prior Art

Motion estimate and motion compensation (MEMC) can be used in the field of video processing where low frame rate is converted to high frame rate. The accuracy of the motion vectors calculated with MEMC will determine the quality of the inserted intermediate frame and affect the quality of the final high frame rate video.

The existing motion compensation method usually divides the video into some small macroblocks, and calculates the motion vector for each macroblock. Due to the instability caused by comparing macroblocks, the motion vector generated by the macroblocks would inevitably cause the motion vectors to mismatch at the edge of the object or the junction between the foreground and the background in the video. In other words, the motion vector of the background would be incorrectly assigned to the foreground object, and the motion vector of the foreground object would be incorrectly assigned to the background. It will affect the quality of motion compensation and thus affecting the quality of the final high frame rate video.

SUMMARY OF THE INVENTION

An embodiment provides a video processing method. The method includes dividing a current frame into a plurality of blocks, generating a motion vector of each block of the plurality of blocks of the current frame according to the each block of the current frame and a corresponding block of a previous frame, generating a global motion vector according to a plurality of motion vectors of the current frame, generating a sum of absolute differences of pixels of each block of the current frame according to the global motion vector, generating a region with a set of blocks of the current frame, matching a distribution of the sum of absolute differences of pixels of the region with a plurality of models, and identifying a best matching model that best matches the distribution of the sum of absolute differences of the pixels of the region, and labeling each block in the region in the current frame with a label of either a foreground block or a background block according to the best matching model.

An embodiment provides a video processing system. The system includes a processor for processing a video, and a memory coupled to the processor for storing the video. The processor divides a current frame of the video into a plurality of blocks, generates a motion vector of each block of the plurality of blocks of the current frame according to the each block of the current frame and a corresponding block of a previous frame, generates a global motion vector according to a plurality of motion vectors of the current frame, generates a sum of absolute differences of pixels of each block of the current frame according to the global motion vector, generates a region with a set of blocks of the current frame, matches a distribution of the sum of absolute differences of pixels of the region with a plurality of models, identifies a best matching model that best matches the distribution of the sum of absolute differences of the pixels of the region, and labels each block in the region in the current frame with a label of either a foreground block or a background block according to the best matching model.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
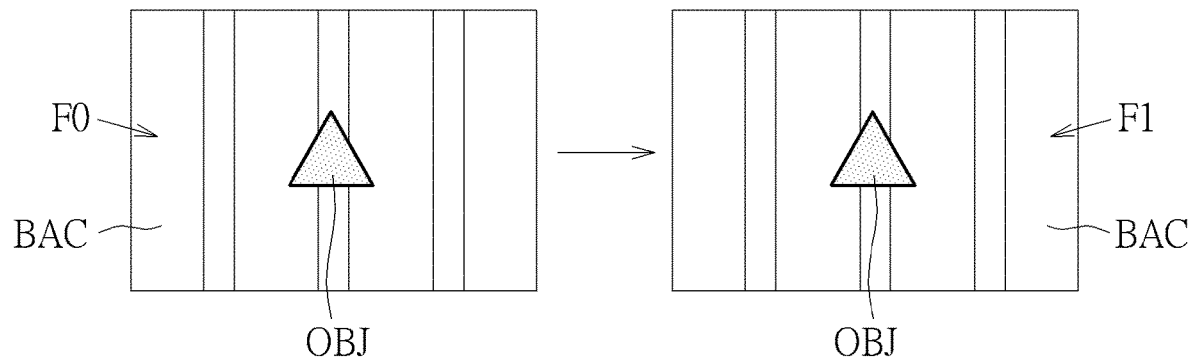
FIG. 1A to 1C are diagrams of video frames of an embodiment of the present invention.
Figure 1B:
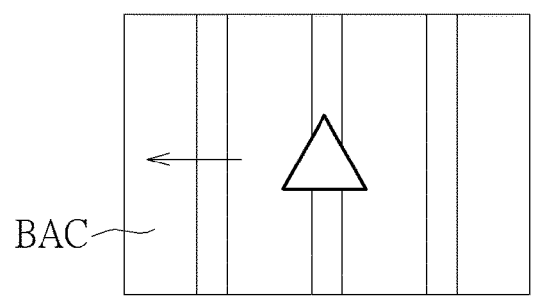
Figure 1C:
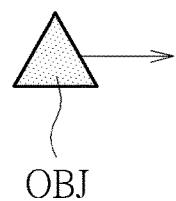

FIG. 1A to 1C are diagrams of video frames of an embodiment of the present invention. A previous frame F0 is the frame of a video at time T−1, and a current frame F1 is the frame of the video at time T. In the video, the foreground object OBJ moves to the right with the background BAC as the reference, and the background BAC moves to the left with respect to the foreground object OBJ.

Figure 2A:
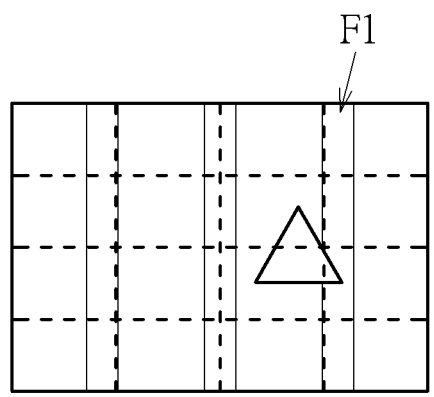
FIG. 2A is a diagram of video frame division of an embodiment.
Figure 2B:
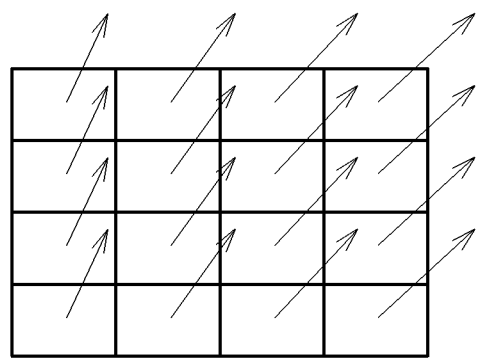
FIG. 2B is a diagram of motion vectors of a video frame in an embodiment.

FIG. 2A is a diagram of video frame division of an embodiment of the present invention. FIG. 2B is a diagram of motion vectors of a video frame of an embodiment of the present invention. As shown in FIG. 2A, the current frame F1 is divided into several blocks by using the conventional motion compensation technique. Each block is composed of M×M pixels, and M can be a positive integer. The corresponding block in the previous frame F0 is identified, so that the direction and size of the motion vector of each block in the current frame F1 can be calculated according to each block in the current frame F1. As shown in FIG. 2B, after the motion vector of each block is obtained, the global motion vector (GMV) of the overall direction and size of the screen can be calculated according to the motion vector of each block. In the embodiment, the block matching algorithm is used to calculate the motion vector. According to the algorithm, each frame of the video is divided into blocks of equal size. A current block in the frame would have a corresponding search area in the previous frame. In the corresponding search area, the algorithm searches for the most similar block in the corresponding search area. Then, the motion vector can be calculated from the two blocks.

Figure 3:
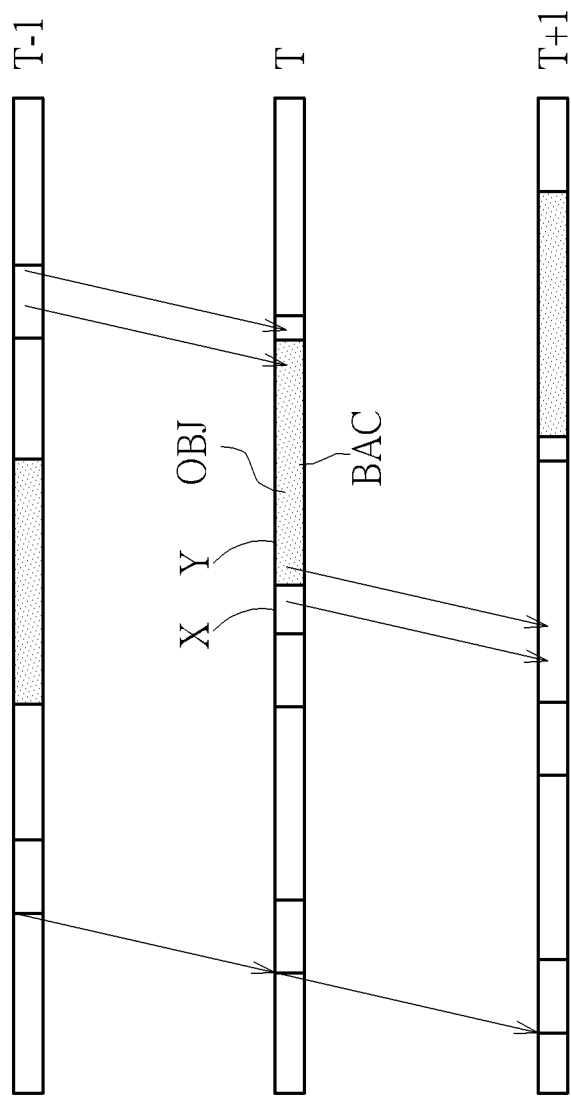
FIG. 3 is a diagram of a part of a video frame of an embodiment.

FIG. 3 is a diagram of a part of the video frame of the embodiment. FIG. 3 shows the video frames at times T−1, T and T+1. As shown in FIG. 3, since the block X only has the background BAC, the sum of absolute differences (SAD) of the pixels calculated from the global motion vector would be a relatively small value. On the other hand, since block Y includes the foreground object OBJ in addition to the background BAC, the sum of absolute differences of the pixels calculated would be a larger value. At the edge of the foreground object OBJ, the sum of absolute differences of the pixels calculated from the global motion vector would change from a smaller value to a larger value.

The sum of absolute differences of the pixels is a measure of the similarity between blocks, which is obtained by calculating the absolute differences between the pixels of two corresponding blocks. The smaller the sum of absolute differences of the pixels is, the more similar the blocks are. The equation of the sum of absolute differences of the pixels is as follows:

$$SAD(u, v) = \sum_{i=0}^{M-1} \sum_{j=0}^{M-1} (|a(i, j)| - |b(i + u, j + v)|)$$

In the formula, a(i, j) represents a pixel in the current block with block size M×M, b(i+u, j+v) represents a pixel located in the corresponding search area, (u, v) represents the motion vector. The equation represents the accumulation of the absolute difference values of the two blocks, the current block and the candidate block with the motion vector (u, v) in the search area. The smaller the sum of absolute differences, the more similar the candidate block is to the current block.

In the embodiment, the global motion vector is substituted into the motion vector (u, v), and the sum of absolute differences of the pixels is calculated. Using this method, the sum of absolute differences between each block and the current frame F1 can be obtained.

Figure 4A:
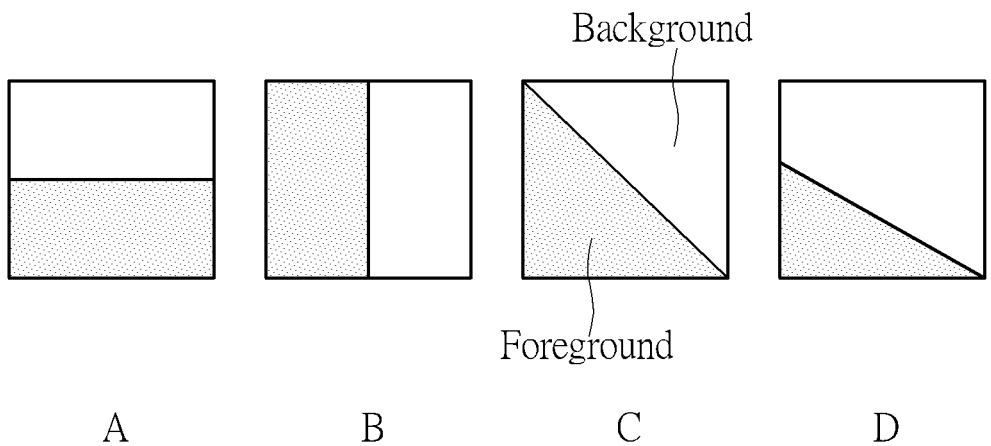
FIG. 4A is a diagram of models of different distributions of the sum of absolute differences in the embodiment.
Figure 4B:
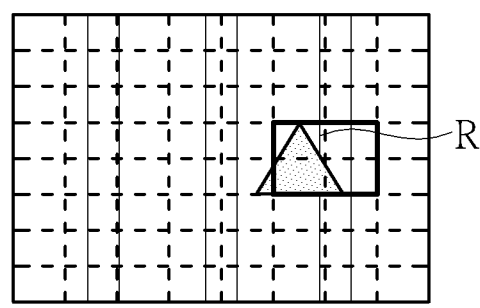
FIG. 4B is a diagram of the video frame matching region in the embodiment.

FIG. 4A is a diagram of models of different distributions of the sum of absolute differences in the embodiment. FIG. 4B is a diagram of the video frame matching region in the embodiment. FIG. 4A shows four models of different distributions of the sum of absolute differences of the pixels, including model A, model B, model C, and model D. These preset models are composed of N×N blocks, where N is a positive integer, such as 2, 5 or 10 etc. Each block of the models A to D has a label. If the sum of absolute differences of the pixels of the block is less than a threshold value, the block is labeled as a background block. Otherwise, if the sum of absolute differences of the pixels of the block is greater than the threshold, the block is labeled as a foreground block.

A region with the same size as the preset model (with N×N blocks) from the video frame can be drawn. The sum of absolute differences of the pixels of the region is matched with that of the model. Whether the region fit the model is determined by the number of blocks from the region matching the model. For example, a region R with 2×2 block is drawn from the video frame in FIG. 4B. Comparing the region R with the models A to D, the model C would have the most blocks with the sum of absolute differences matching the region R. It can be determined that the region R matches the model C. Then, each block in the region R can be labeled as a foreground block or a background block according to the foreground block label or the background label of the model C. The previously described steps can be repeated until each block in the current frame is labeled.

Finally, MEMC (motion estimate and motion compensation) technique can be implemented to modify the motion vector of each block of the current frame according to the label of each block to improve the accuracy of the motion vector at the junction of the foreground moving object and the background. Therefore it can improve the integrity of the edge of the object in the video enhanced with MEMC technique.

Figure 5:
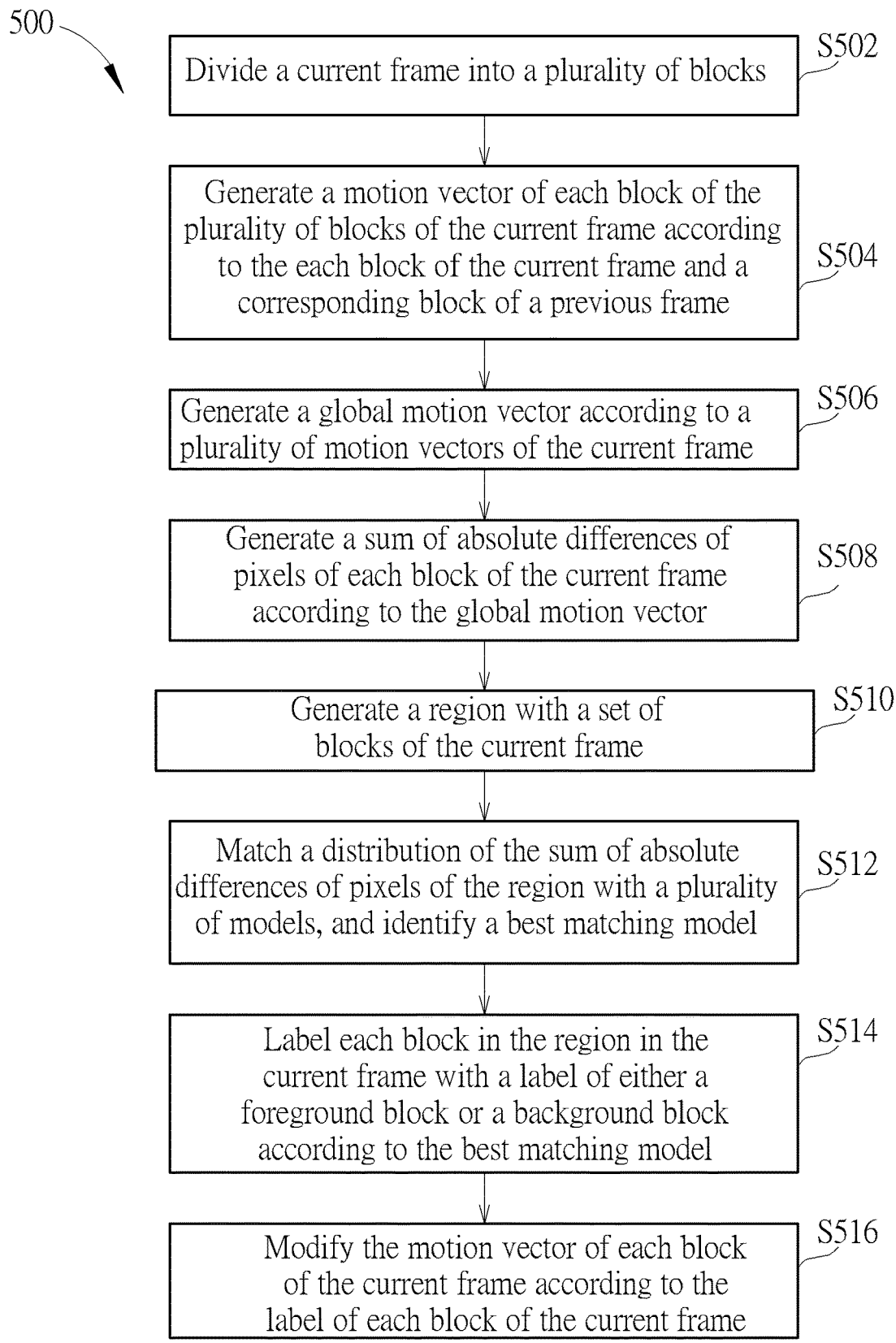
FIG. 5 is a flowchart of a video processing method.

FIG. 5 is a flowchart of a video processing method 500, which includes the following steps:

S502: Divide a current frame into a plurality of blocks;
S504: Generate a motion vector of each block of the plurality of blocks of the current frame according to each block of the current frame and a corresponding block of a previous frame;
S506: Generate a global motion vector according to a plurality of motion vectors of the current frame;
S508: Generate a sum of absolute differences of pixels of each block of the current frame according to the global motion vector;
S510: Generate a region with a set of blocks of the current frame;
S512: Match a distribution of the sum of absolute differences of pixels of the region with a plurality of models, and identify a best matching model;
S514: Label each block in the region in the current frame with a label of either a foreground block or a background block according to the best matching model;
S516: Modify the motion vector of each block of the current frame according to the label of each block of the current frame.

Figure 6:
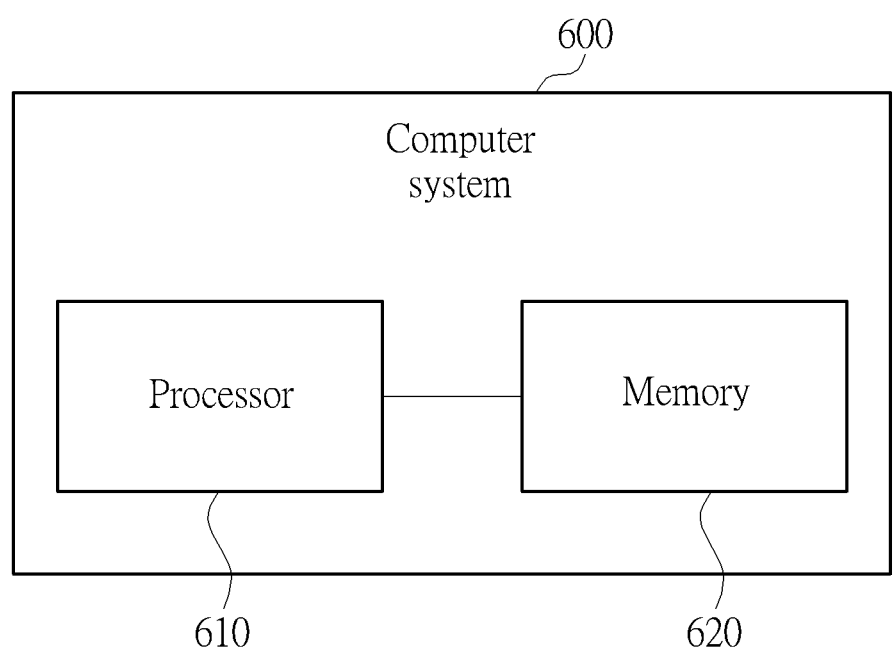
FIG. 6 is a diagram of a computer system for performing the video processing method of FIG. 5.

FIG. 6 is a diagram of a computer system 600 for performing the video processing method 500. The computer system 600 includes a processor 610 and a memory 620. The memory 620 stores computer programs for executing the video processing method 500 through the processor 610. For example, the memory 620 may include a flash memory, a magnetic disk, an internal hard disk or a removable disk. The processor 610 and memory 620 can be an application-specific integrated circuit (ASIC) or be incorporated into an application-specific integrated circuit. The processor 610 may be any processor suitable for executing computer programs. The computer program can be written in any form of programming languages.

In summary, given MEMO is often inaccurate at the edges of moving objects, a simple, fast and more accurate method is implemented to identify the foreground and background blocks. The moving objects in the video frames can be separated and at the junction of the moving objects and the background, the motion vectors can be calibrated to improve the accuracy of the motion vectors of the blocks. Thus, it can improve the integrity of the edge of the object in the video enhanced with MEMC technique.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method, comprising:
   dividing a current frame into a plurality of blocks;
   generating a motion vector (MV) of each block of the plurality of blocks of the current frame according to the each block of the current frame and a corresponding block of a previous frame;
   generating a global motion vector (GMV) according to a plurality of motion vectors of the current frame;
   generating a sum of absolute differences (SAD) of pixels of each block of the current frame according to the global motion vector;

generating a region comprising a set of blocks of the current frame;

matching a distribution of the sum of absolute differences of pixels of the region with a plurality of models, and identifying a best matching model that best matches the distribution of the sum of absolute differences of the pixels of the region; and labeling each block in the region in the current frame with a label of either a foreground block or a background block according to the best matching model.

2. The method of claim 1, further comprising modifying the motion vector of each block of the current frame according to the label of each block of the current frame.

3. The method of claim 1, wherein each block of the current frame comprises M×M pixels, M being a positive integer.

4. The method of claim 1, wherein the region comprises N×N blocks, N being a positive integer.

5. The method of claim 1, wherein each block of a model has a label, and if the sum of absolute differences of pixels of a block of the model is less than a threshold value, the block is labeled as the background block.

6. A video processing system, comprising:
a processor configured to process a video; and
a memory coupled to the processor, configured to store the video;
wherein the processor divides a current frame of the video into a plurality of blocks, generates a motion vector (MV) of each block of the plurality of blocks of the current frame according to the each block of the current frame and a corresponding block of a previous frame, generates a global motion vector (GMV) according to a plurality of motion vectors of the current frame, generates a sum of absolute differences (SAD) of pixels of each block of the current frame according to the global motion vector, generates a region comprising a set of blocks of the current frame, matching a distribution of the sum of absolute differences of pixels of the region with a plurality of models, identifies a best matching model that best matches the distribution of the sum of absolute differences of the pixels of the region, and labels each block in the region in the current frame with a label of either a foreground block or a background block according to the best matching model.

7. The system of claim 6, wherein the processor modifies the motion vector of each block of the current frame according to the label of each block of the current frame.

8. The system of claim 6, wherein each block of the current frame comprises M×M pixels, M being a positive integer.

9. The system of claim 6, wherein the region comprises N×N blocks, N being a positive integer.

10. The system of claim 6, wherein each block of a model has a label, and if the sum of absolute differences of pixels of a block of the model is less than a threshold value, the block is labeled as the background block.

* * * * *